United States Patent [19]

Gordon

[11] Patent Number: 4,663,249
[45] Date of Patent: May 5, 1987

[54] ELECTROCHEMICAL POWER GENERATION

[75] Inventor: Arnold Z. Gordon, Lyndhurst, Ohio

[73] Assignee: Gould Inc., Rolling Meadows, Ill.

[21] Appl. No.: 835,770

[22] Filed: Mar. 3, 1986

[51] Int. Cl.[4] .................. H01M 8/06; H01M 12/04
[52] U.S. Cl. ................................ 429/14; 429/17; 429/199; 429/19
[58] Field of Search ............... 429/14, 27, 17, 19, 429/199, 198, 200, 201, 49, 51

[56] References Cited

U.S. PATENT DOCUMENTS

| | | | |
|---|---|---|---|
| 3,791,871 | 2/1974 | Rowley | 136/100 |
| 3,976,598 | 8/1976 | Tsai et al. | 136/154 |
| 4,007,057 | 2/1977 | Littauer et al. | 429/57 |
| 4,528,248 | 7/1985 | Galbraith | 429/8 |

*Primary Examiner*—Donald L. Walton
*Attorney, Agent, or Firm*—Wood, Dalton, Phillips, Mason & Rowe

[57] ABSTRACT

A power generation system utilizing an electrochemical cell comprising a reactive metal anode, a cathode spaced from the anode and an electrolyte comprising an aqueous solution of the hydroxide of the reactive metal is disclosed. The hydroxide concentration in the electrolyte is controlled by contacting the electrolyte with acids or salts thereof having a first anion comprising at least two elements with at least one of the elements being a non-metal. Upon contact with the electrolyte, the anion hydrolyzes to yield at least second or third anions which react with the hydroxide of the reactive metal to yield compounds thereof which are insoluble in the electrolyte. The insoluble compounds are separated from the electrolyte and the electrolyte is recirculated to the electrochemical cell.

18 Claims, 1 Drawing Figure

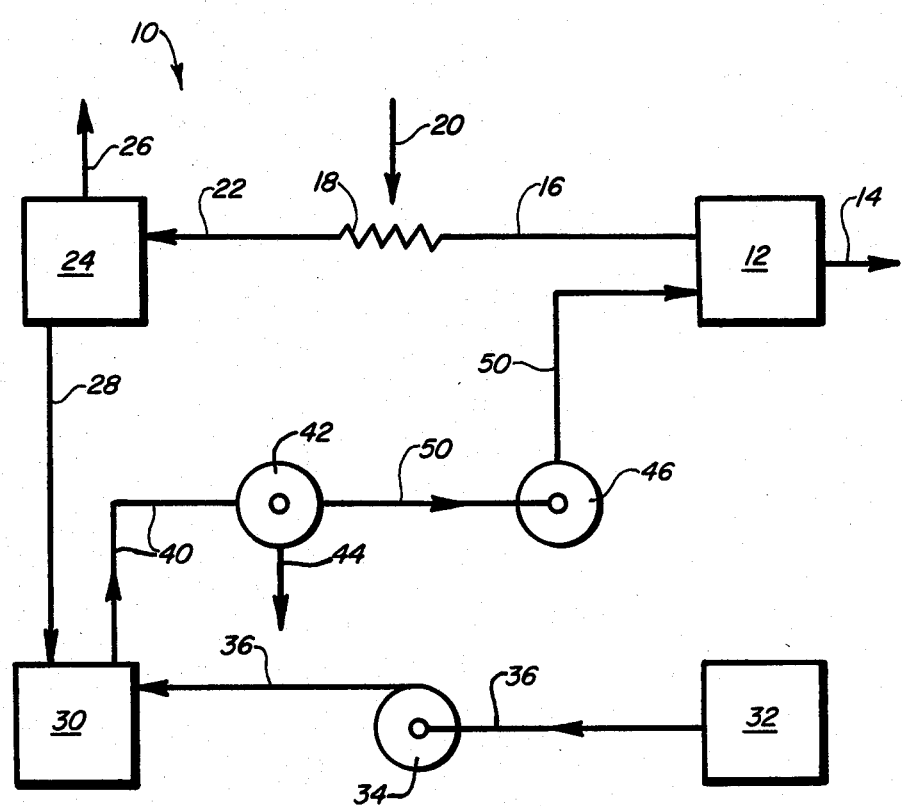

ELECTROCHEMICAL POWER GENERATION

BACKGROUND OF THE INVENTION

1. Field of the Invention

This invention relates generally to power generation systems and, more particularly, this invention relates to electrochemical cells and methods for improving performance therein.

2. Description of Related Art

Electrochemical cells utilizing a reactive metal anode, an electrically conductive cathode, and an aqueous electrolyte are well known. Such cells are described in detail in numerous patents and publications, including Rowley U.S. Pat. No. 3,791,871 (Feb. 12, 1974) and Galbraith U.S. Pat. No. 4,528,248 (July 9, 1985), the respective disclosures of which are incorporated herein by reference.

The cell disclosed in the Rowley patent typifies prior electrochemical cells and utilizes a metal anode which is highly reactive with water and spaced from a cathode by an electrically insulating film formed on the anode in the presence of water. The anode and cathode are in contact with an aqueous electrolyte during cell operation. In the cell of the Rowley patent, the anode comprises an elemental alkali metal such as sodium or lithium, and the electrolyte comprises an aqueous solution of sodium hydroxide or lithium hydroxide, respectively, produced by the electrochemical reaction of the anodic metal with water.

The anode of the Rowley patent is coated with a thin film of a non-reactive, partially water soluble material which is not electrically conductive. The film is porous and allows transport of aqueous electrolyte to the anode and transport of reaction products away from the anode. Preferably, the film is the natural hydrated oxide which forms on the metal surface as it is exposed to humid air. However, other suitable water soluble insulators may serve as the film.

The electrolyte of the cell disclosed in the Rowley patent is preferably a hydroxide of the alkali metal utilized as the anode since such hydroxide is naturally formed during operation of the cell and hence the cell automatically regenerates the electrolyte during operation. Thus, in the Rowley cell, water is introduced to the cell at a restricted rate and brought into direct contact with both the cathode and the anode. The water dissolves a portion of the soluble film on the anode, resulting in the production of a hydrated hydroxide of the anode material, plus heat. As the reaction proceeds, useful electrical power is produced.

The anode and the cathode are not in direct electrical contact with each other, but circuit connections are made at each electrode for drawing electrical power from the cell.

The alkali metal of the anode is highly reactive with water. This reactivity, however, decreases as the concentration of metal hydroxide in the electrolyte increases. As the metallic hydroxide concentration in the cell rises, the rate of power generation from the cell correspondingly diminishes, and passivation of the anode can occur if the electrolyte becomes saturated with the metal hydroxide. Thus, to maintain a desired level of power output from such electrochemical cells, relatively high concentrations of the reactive metal hydroxide should be avoided. Therefore, steps must be taken to maintain the reactive metal hydroxide concentration in the electrolyte at a level at which useful electrical current is produced. Optimally (at typical operating temperatures), the concentration of the metal hydroxide in the electrolyte is maintained at about 80% of saturation for the electrolyte.

One solution to the problem of too great a concentration of the reactive metal hydroxide in the electrolyte is the continuous expulsion of a fraction of the electrolyte stream into the surrounding environment, and the simultaneous injection of a similar flow rate of fresh water into the electrolyte. If the stream input and output are kept balanced and prorated by metal hydroxide production, this technique is effective. However, the technique has several disadvantages. Firstly, the motion of the inlet and outlet flow streams results in significant noise levels and the noise generated may exceed desired and/or tolerable noise limits. Secondly, the technique requires a continuous source of fresh feed water. For non-marine applications, there is no such ready source of inlet water and even if such inlet water were carried on board, its weight would, in most uses, be prohibitive. Accordingly, all such closed loop electrochemical cells require some form of "electrolyte management", i.e., the removal of the reactive metal hydroxide from the circulated electrolyte.

The use of simple acids, such as phosphoric acid, hydrogen fluoride, etc., as an electrolyte management agent for closed loop electrochemical cells, wherein the simple acid acts as a precipitant for the reactive metal hydroxide, generally suffers from the relatively great overhead weight burden imposed on the cell per gram of reactive metal hydroxide removed from the circulated electrolyte. Also, the extreme toxicity, volatility and dangerous propensities exhibited by some simple acids, such as hydrogen fluoride, make these materials unattractive as electrolyte management agents.

SUMMARY OF THE INVENTION

It is an object of the present invention to overcome one or more of the problems described above.

According to the present invention, a power generation system comprises an electrochemical cell including a reactive metal anode, a cathode spaced from the anode and an electrolyte comprising an aqueous solution of the hydroxide of the reactive metal. In addition, the system includes a source of an acid or salt thereof having a first anion comprising at least two elements, at least one of which is a non-metal. Upon contact with the electrolyte, the anion hydrolyzes to yield at least second and third anions which react with the hydroxide of the reactive metal to yield compounds of the reactive metal which are insoluble in the electrolyte.

The insoluble compounds so formed are then separated from the electrolyte, thus reducing the hydroxide concentration in the electrolyte. The resulting electrolyte is recirculated to the electrochemical cell for continuous and efficient cell operation.

Other objects and advantages will be apparent those skilled in the art in the following detailed description taken in conjunction with the drawing and the appended claims.

BRIEF DESCRIPTION OF THE DRAWING

The sole figure is a schematic flow diagram of a system for electrolyte management according to a typical embodiment of the present invention.

DETAILED DESCRIPTION OF THE INVENTION

According to the invention, a power generation system and a method of power generation and electrolyte management in aqueous/reactive metal electrochemical cells is provided. The invention contemplates a system for power generation having an electrochemical cell with a lithium or other reactive metal anode. The present invention may be used with any configuration of cell which operates to produce the hydroxide of the anodic metal in an aqueous electrolyte. The cell typically includes a reactive metal anode, a cathode spaced from the anode to define a reaction zone therewith and an aqueous electrolyte (with or without additives).

Lithium is a preferred anodic material because of its high energy density. Other reactive metals, such as other alkali metals, for example, may be used. The metal of the anode may be present in elemental, compound, alloy, amalgam or mixture form, as desired. Reference herein to the preferred lithium is exemplary only, as the invention encompasses the use of other reactive metals.

An electrochemical reaction occurs at the anode, as is well known, to produce a cation of the anodic metal, and an electron. The anodic cation reacts with the negatively charged ionic specie (typically hydroxide ion) in the electrolyte to form an anodic reaction product, typically lithium hydroxide (LiOH) in the case of a lithium anode.

As is well known in the art, alkali metal anodes are coated with a water-soluble, metal ion permeable insulating coating of the hydrated hydroxide of the anodic metal. This coating naturally forms on the anode upon exposure of the anode to humid air and acts to modulate the electrochemical reaction.

The metal hydroxide coating on the anode typically effects spacing between the anode and cathode, which may be in physical contact, but not direct electrical contact with each other. As is well known in the art, however, other physical spacers, such as foam, screen, beads or combinations thereof, may be present.

Referring to the figure, a system, generally designated 10, for electrolyte management is shown. The system 10 includes a cell stack 12 comprising a plurality of reactive metal anode electrochemical cells. It is to be understood, however, that the invention may also be practiced with an individual electrochemical cell.

The cell stack 12 generates an electrical power output 14 which can be used for work. An electrolyte flow stream 16, containing dissolved lithium hydroxide with hydrogen gas dispersed therein, is circulated from the cell stack 12 through a heat exchanger 18. The hydrogen gas forms as a by-product of the parasitic corrosion reaction which occurs in each cell of the stack 12. The heat exchanger 18 removes heat from the stream 16 by indirectly contacting the stream 16 with a cooling stream 20 of air or water passing through heat exchanger 18. Cooling of the stream 16 facilitates handling of the electrolyte.

A cooled electrolyte flow stream 22 exits the heat exchanger 18 and is passed to an electrolyte reservoir/gas separator 24 wherein hydrogen gas, as well as other gases which may be present in the electrolyte flow stream 22, are vented, as signified by the flow stream 26, resulting in an aqueous lithium hydroxide solution, depicted as a flow stream 28. The stream 28 is circulated from the reservoir/gas separator 24 to a liquid/liquid contactor 30. The contactor 30 may take the form of a tank wherein the electrolyte management agent is mixed with the electrolyte. Any of the standard techniques, known in the chemical arts, by which mixing is accomplished may be used, e.g. stirring, counter current flow, etc.

A complex acid or a salt of complex acid (as described below), in liquid form is circulated from a storage container 32 by means of a pump 34 through a stream 36 to the contactor 30 wherein the acid or salt thereof reacts with lithium hydroxide in the stream 28 to form compounds of lithium which are insoluble in the electrolyte.

A product stream 40 passes from the contactor 30 to a suitable liquid/solid separating means 42, such as a centrifuge or filter, for example, for the removal of solids, signified by a flow stream 44, including the insoluble compound of lithium. The compound so removed can be ejected from the cell to remove unnecessary weight, or it can be stored for later recovery of its lithium metal.

A circulation pump 46 circulates the electrolyte from the separator 42 via a stream 50 to the cell stack 12, for use of the electrolyte in producing electrical power.

Rather than simple acids such as $H_3PO_4$, HF, etc., the invention utilizes an acid or salt thereof having a first anion comprising at least two elements with at least one of the elements being a non-metal. This anion, upon contact with the electrolyte, hydrolyzes to yield two or more new anions which react with the hydroxide of the reactive metal to yield compounds of the reactive metal which are insoluble in the electrolyte. For example, when the additive agent $(NH_4)PF_6$ is contacted with an aqueous alkaline medium, the anion comprising $PF_6^-$ hydrolyzes to yield $6F^-$ and $PO_4^-$. These anions in turn react with the hydroxide of the reactive metal to yield insoluble compounds of the reactive metal, such as LiF and $Li_3PO_4$.

In general, preferred complex acids and salts of the invention contain fluorine and/or oxygen. Preferred acids for use in the practice of the invention include $H_2SiF_6$, $H_2PO_3F$, $HPO_2F_2$, $H(NH_4)_2AlF_6$ and $HPF_6$. Preferred salts for use in the practice of the invention include $NaPF_6$, $Na_2TiF_6$ and $NaAsF_6$.

The use of a simple acid as a precipitant for the reactive metal hydroxide generally imposes on the cell a comparatively great overhead weight burden per gram of metal (from the hydroxide) removed from the electrolyte as compared to the complex acids and salts of the invention. For example, the use of phosphoric acid as the electrolyte management chemical precipitant imposes a burden of 4.7 grams for each gram of lithium metal precipitated from the electrolyte. Phosphoric acid reacts with the lithium hydroxide in the electrolyte, as follows:

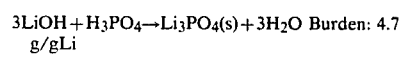

$$3LiOH + H_3PO_4 \rightarrow Li_3PO_4(s) + 3H_2O \quad \text{Burden: 4.7 g/gLi}$$

As indicated by the above reaction, three moles of lithium (having a gram molecular weight of about 6.94 g/mole) precipitate out of solution (in the form of $Li_3PO_4$) per mole of phosphoric acid (having a gram molecular weight of about 98.00 g/mole). Thus, about 4.7 grams of precipitant, in the form of phosphoric acid, are required per gram of lithium precipitated.

The complex acids of the present invention, however, are generally substantially more gravimetrically attractive than such simple acids, as the following exemplary reactions indicate:

| | Burden (g/g Li) |
|---|---|
| $H_2SiF_6 + 8LiOH \rightarrow Li_2SiO_3(s) + 6LiF(s) + 5H_2$ | 2.6 |
| $H_2PO_3F + 4LiOH \rightarrow Li_3PO_4(s) + LiF(s) + 3H_2O$ | 3.6 |
| $HPO_2F_2 + 5LiOH \rightarrow Li_3PO_4(s) + 2LiF(s) + 3H_2O$ | 2.9 |
| $(NH_4)_3AlF_6 + 9LiOH \rightarrow Li_3AlO_3(s) + 6LiF(s) + 6H_2O + 3NH_3(g)$ | 3.1 |
| $(NH_4)PF_6 + 9LiOH \rightarrow Li_3PO_4(s) + 6LiF(s) + 5H_2O + NH_3(g)$ | 2.6 |

Some simple acids, such as hydrogen fluoride, for example, are more gravimetrically attractive than the previously identified simple acid, phosphoric acid. Hydrogen fluoride imposes a burden of about 2.9 g/gLi as compared to the burden of 4.7 g/gLi imposed by $H_3PO_4$. Hydrogen fluoride, however, exhibits such extreme toxicity and volatility, that for safety reasons, the use thereof as an electrolyte management agent is not desirable. The complex acids and salts of the invention, in addition to being gravimetrically attractive, generally do not present handling and safety problems the magnitude of those that accompany the use of hydrogen fluoride.

In view of the direct correlation between atomic numbers, atomic weight and molecular weight, i.e., atoms with higher atomic numbers have greater atomic weights and molecules comprising atoms having greater atomic weights have higher molecular weights, generally, those acids or salts having cations comprising elements having atomic numbers less than about 50 are preferred. For example, $H^+$ and $NH_4^+$ are preferred cations comprising elements having atomic numbers less than about 50.

It is to be understood that the electrolyte management agents of the invention may be prepared and used in various forms such as liquids or solids, for example, $H_2SiF_6$ may be prepared as a water solution and used in a manner such as described above.

The following examples illustrate compounds useful in the practice of the invention. It is understood that all changes and modifications that come within the spirit of the invention are desired to protected and thus the invention is not to be construed as limited by these examples.

A 4.0 molar solution of lithium hydroxide monohydrate, $LiOH \cdot H_2O$, in deionized water was prepared. This solution is a protypical electrolyte for lithium-/aqueous alkaline electrolyte batteries.

EXAMPLE A

One cubic centimeter (cc) of hydrofluorosilicic acid, $H_2SiF_6$, was added to a stirred beaker containing 50 cc of the above-described 4.0 M $LiOH \cdot H_2O$. Upon addition, a fine white milky precipitate promptly formed.

EXAMPLE B

Using the procedure of Example A, 1 cc of fluorophosphoric acid, $H_2PO_3F$, also known as monofluorophosphoric acid, was added to 50 cc of the above-described 4.0 M $LiOH \cdot H_2O$ solution in a stirred beaker. Upon contact of the fluorophosphoric acid with the aqueous lithium hydroxide, a relatively dense white precipitate promptly formed.

EXAMPLE C

Using the procedure of Example A, 1 cc of difluorophosphoric acid, $HPO_2F_2$, was added to 50 cc of the above-described 4.0 M $LiOH \cdot H_2O$ solution in a stirred beaker. This precipitating agent is related to monoflurophosphoric acid, except that in the case of the difluoro acid, there are two fluorines and one hydroxyl group per molecule. The diflurophosphoric acid used was a dark brown liquid which fumed for several minutes upon contact with room air. Upon addition of the difluorophosphoric acid to the lithium hydroxide solution, a relatively dense, white precipitate formed. The precipitate appeared to be quite similar to the material formed upon addition of monofluorophosphoric acid to a lithium hydroxide solution.

EXAMPLE D 1 cc of sodium hexafluorophosphate, $NaPF_6$, was added to 50 cc of the above-described 4.0 M $LiOH \cdot H_2O$ solution in a stirred beaker. Sodium hexafluorophosphate is the salt of $HPF_6$ and is available in a fine white powder solid form. Upon addition of the sodium hexafluorophosphate to the aqueous lithium hydroxide, the additive dissolved and after about one minute, precipitation occurred and yielded a fairly fine milky white precipitate.

EXAMPLE E

Sodium hexafluorotitanate, $Na_2TiF_6$, was added to 50 cc of the above described 4.0 M $LiOH \cdot H_2O$ solution. The addition of the additive agent was found to yield a white precipitate.

EXAMPLE F

Sodium hexfluoroarsenate, $NaAsF_6$, was tested as a precipitating agent for the electrolyte. Upon addition to 50 cc of the above-descibed 4.0 M $LiOH \cdot H_2O$ solution contained in a stirred beaker, a white precipitate formed.

The foregoing detailed description is given for clearness of understanding only, and no unnecessary limitations are to be understood therefrom, as modifications within the scope of the invention will obvious to those skilled in the art.

I claim:

1. A power generation system comprising:
   an electrochemical cell including a reactive metal anode, a cathode spaced from said anode, and an electrolyte comprising an aqueous solution of the hydroxide of said reactive metal;
   a source of an acid or salt thereof having a first anion comprising at least two elements with at least one of said elements being a non-metal, which anion upon contact with said electrolyte hydrolyzes to yield at least second and third anions which react with said hydroxide of said reactive metal to yield at least one compound of said reactive metal which is insoluble in said electrolyte;
   means for contacting said electrolyte with said acid or salt to form said insoluble compound;
   means for separating said insoluble compound from said electrolyte; and
   means for recirculating said separated electrolyte to said electrochemical cell.

2. The system of claim 1 wherein said reactive metal comprises an alkali metal.

3. The system of claim 2 wherein said alkali metal comprises lithium.

4. The system of claim 1 wherein said acid or salt contains fluorine.

5. The system of claim 4 wherein said acid or salt comprises a compound selected from the group consisting of $H_2SiF_6$, $NaPF_6$, $Na_2TiF_6$, $NaAsF_6H(NH_4)_2AlF_6$, $(NH_4)_3ALF_6$, $(NH_4)PF_6$ and $(HRF)_6$.

6. The system of claim 4 wherein said acid or salt additionally contains oxygen.

7. The system of claim 4 wherein said acid or salt comprises a compound selected from the group consisting of $H_2PO_3F$ and $HPO_2F_2$.

8. The system of claim 1 wherein said acid or salt further comprises a cation comprising elements having atomic numbers less than about 50.

9. The system of claim 8 wherein said cation is selected from the group consisting of $H^+$ and $NH_4^+$.

10. A method of power generation, said method comprising the steps of:
supplying an electrolyte to an electrochemical reaction zone defined between a reactive metal anode and a cathode spaced from said anode in an electrochemical cell, said electrolyte comprising an aqueous solution of the hydroxide of said reactive metal;
contacting said electrolyte with an acid or salt thereof having a first anion comprising at least two elements with at least one of said elements being a non-metal, which anion upon contact with said electrolyte hydrolyzes to yield at least second and third anions which react with said hydroxide of said reactive metal to yield at least one compound of said reactive metal which is insoluble in said electrolyte;
separating said insoluble compound from said electrolyte; and
recirculating said separated electrolyte to said reaction zone.

11. The method of claim 10 wherein said reactive metal comprises an alkali metal.

12. The method of claim 11 wherein said alkali metal comprises lithium.

13. The method of claim 10 wherein said acid or salt contains fluorine.

14. The method of claim 13 wherein said acid or salt comprises a compound selected from the group consisting of $H_2SiF_6$, $NaPF_6$, $Na_2TiF_6$, $NaAsF_6$, $H(NH_4)_2AlF_6$, $(NH_4)_3AlF_6$, $(NH_4)PF_6$ and $HPF_6$.

15. The method of claim 13 wherein said acid or salt additionally contains oxygen.

16. The method of claim 13 wherein said acid or salt comprises a compound selected from the group consisting of $H_2PO_3F$ and $HPO_2F_2$.

17. The method of claim 10 wherein said acid or salt further comprises a cation comprising elements having atomic numbers less than about 50.

18. The method of claim 17 wherein said cation is selected from the group consisting of $H^+$ and $NH_4^+$.

* * * * *